J. H. MENKHAUS.
SQUEEGEE.
APPLICATION FILED MAR. 22, 1920.
1,351,862.
Patented Sept. 7, 1920.
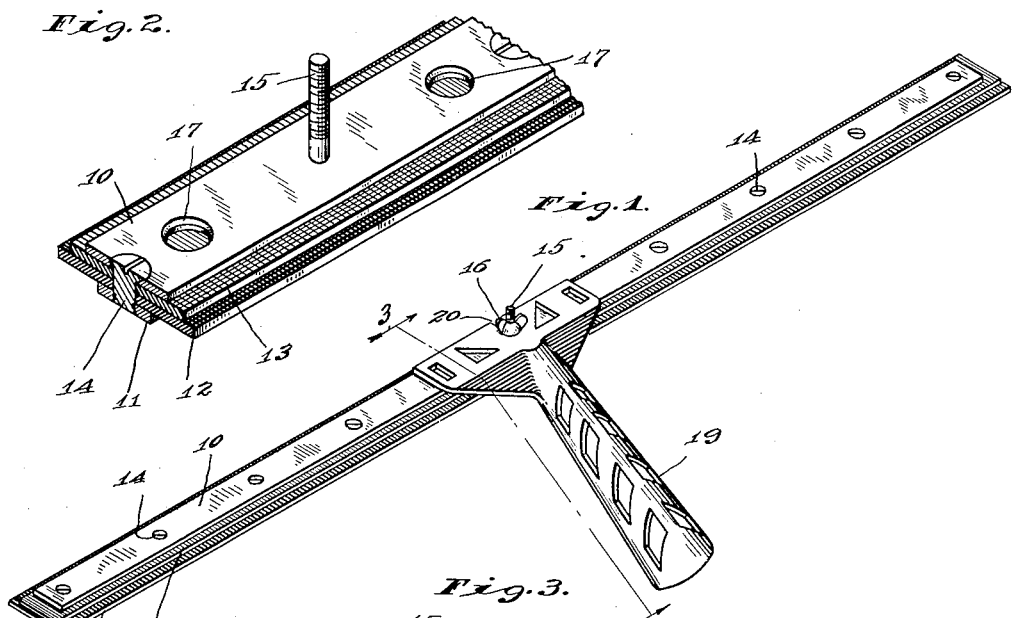
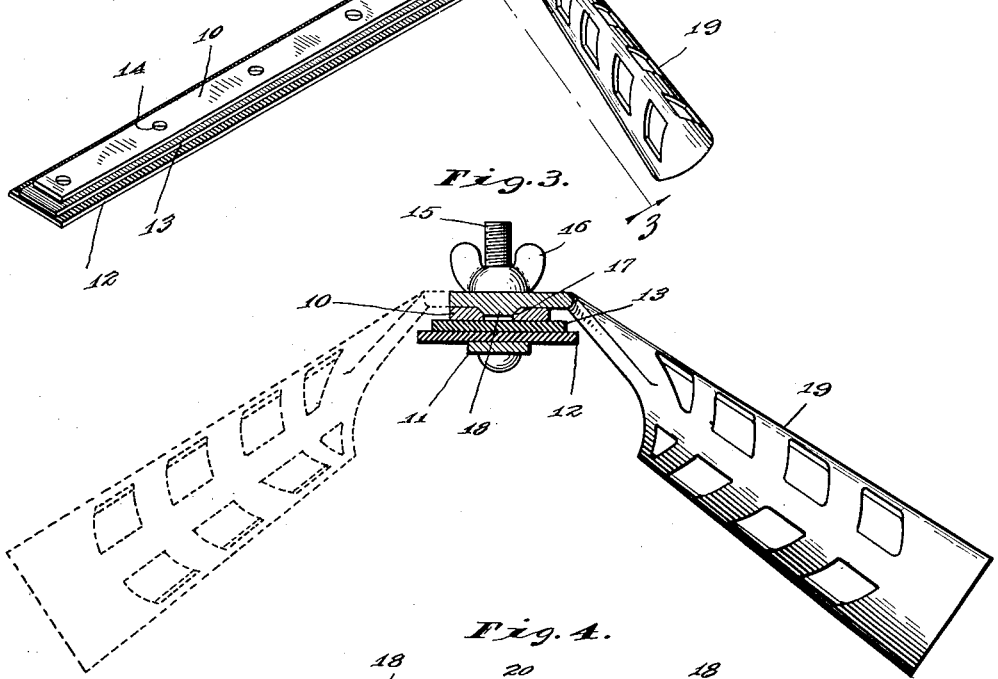
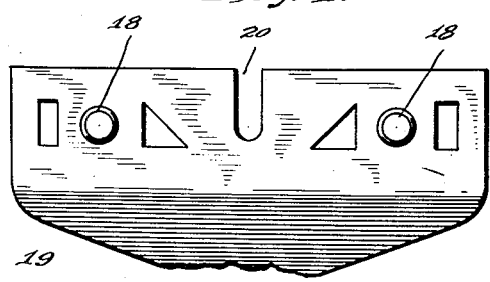
Inventor
John H. Menkhaus

UNITED STATES PATENT OFFICE.

JOHN H. MENKHAUS, OF CINCINNATI, OHIO.

SQUEEGEE.

1,351,862.  Specification of Letters Patent.  Patented Sept. 7, 1920.

Application filed March 22, 1920. Serial No. 367,700.

*To all whom it may concern:*

Be it known that I, JOHN H. MENKHAUS, a citizen of the United States, residing at Cincinnati, in the county of Hamilton and State of Ohio, have invented a new and useful Squeegee, of which the following is a specification.

The object of my invention is to provide an efficient and economical squeegee.

The accompanying drawings illustrate my invention.

Figure 1 is a perspective view of an embodiment of my invention; Fig. 2 a fragmentary perspective section of the squeegee element; Fig. 3 a section on line 3—3 of Fig. 1; and Fig. 4 a fragmentary plan of the handle.

In the drawings, 10 and 11 indicate, respectively, upper and lower metal clamping strips between which are clamped the active rubber strip 12 and the backing rubber strip 13, by bolts 14.

Passing through the middle of the several strips is a bolt 15 provided with a butterfly nut 16.

Strip 13 is slightly wider and longer than strips 10 and 11, and strip 12 is slightly wider than strip 13, the arrangement being such that either long edge of strip 12 may be used, strip 13 affording a resilient backing for the edges of strip 12 so that neither strip may be sharply deflected over the edges of the upper metal strip 10, thereby preventing cracking of the rubber strips.

Equally spaced from bolt 15, at each side, strip 10 is perforated at 17 to receive tapered lugs 18 carried by the handle 19 at equal distances at each side of a slot 20 adapted to receive bolt 15.

By the above arrangement the strip 12, though not substantially wider than similar strips now commonly used in holders presenting only one edge for active use, presents two active edges either one of which may be used by properly attaching the squeegee element to the handle.

I claim as my invention:

1. A squeegee comprising a handle member having a laterally extended head provided with a slot open at one end, and having members for interlocking engagement with the squeegee member; and a squeegee member comprising a metal plate carrying a threaded bolt for entry in said slot, a nut on the bolt for clamping engagement with the handle member, and a rubber strip laterally extended beyond both edges of said metal plate.

2. A squeegee comprising a handle member having a laterally extended head provided with a slot open at one end, and having members for interlocking engagement with the squeegee member; and a squeegee member comprising a metal plate carrying a threaded bolt for entry in said slot, a nut on the bolt for clamping engagement with the handle member, a rubber strip laterally extended beyond both edges of said metal plate, and a rubber backing strip between said first-mentioned rubber strip and of greater width than the metal plate.

In witness whereof, I have hereunto set my hand at Cincinnati, Ohio, this 18th day of March, A. D. one thousand nine hundred and twenty.

JOHN H. MENKHAUS.